Figure 1:
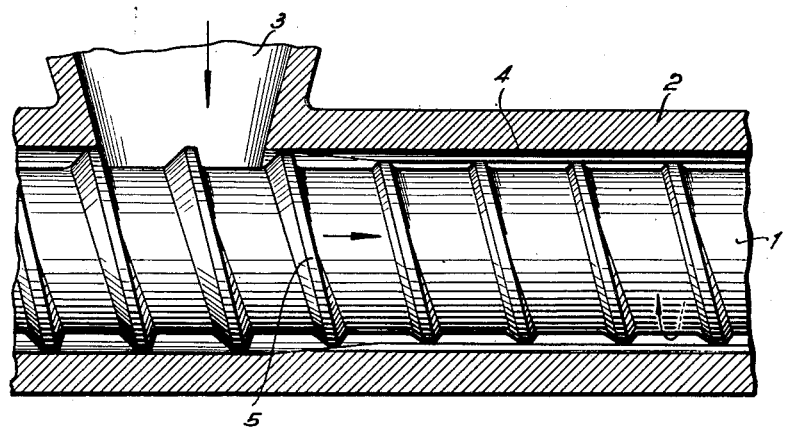

Nov. 20, 1956 H. REIFENHÄUSER 2,770,837

EXTRUDING PRESS

Filed Feb. 24, 1953

INVENTOR
Hans Reifenhäuser

United States Patent Office 2,770,837
Patented Nov. 20, 1956

2,770,837

EXTRUDING PRESS

Hans Reifenhäuser, Troisdorf, Rhineland, Germany, assignor to Hugo Stinnes Verwaltung G. m. b. H., Mulheim an der Ruhr, Germany Application February 24, 1953, Serial No. 338,476

Claims priority, application Germany February 23, 1952

1 Claim. (Cl. 18—12)

The present invention relates to extruding presses.

More particularly, the present invention relates to that type of extruding press in which a plastic material is moved along a casing and pressed out of an outlet opening of the casing through the medium of a worm screw turnably mounted in the casing.

One of the well known problems of extrusion presses of this type is that the material being pressed sometimes slides radially around the inner surface of the casing, and this defect has already been overcome by providing the inner surface of the tubular casing with elongated gooves extending along the length thereof. However, even with such grooves it often happens that the material becomes stopped up and does not move properly along the casing particularly in that region of the casing to which the material is supplied.

One of the objects of the present invention is to overcome this disadvantage.

A further object of the present invention is to overcome this disadvantage by a simple variation in the structure of the tubular casing.

Another object of the present invention is to overcome this disadvantage by a simple variation in the structure of the worm screw.

An additional object of the present invention is to provide a worm screw and casing which is capable of handling and moving a larger amount of material at the entrance portion of the casing than at the subsequent portions thereof.

With the above objects in view the present invention mainly consists of an extruding press which includes an elongated tubular casing having an inner surface formed with grooves extending along a first portion of the casing, the latter having next to the first portion thereof a second portion of a larger inner diameter than said first portion and provided with a smooth inner surface free of grooves, this casing being formed with an opening at this second portion thereof which is spaced from the first portion thereof. A hopper means is connected to the casing at the opening thereof, and a worm screw is turnably mounted in the casing, the thread of this worm screw having in the first portion of the casing an outer diameter substantially equal to the inner diameter of this first portion and in the second portion of the casing and outer diameter substantially equal to the inner diameter of the second portion of the casing, and this worm screw thread has a root diameter which is substantially constant in the first and second portions of the casing.

Figure 2:
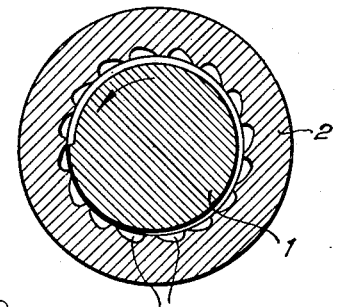

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary, longitudinal, partly sectional view of an extruding press constructed in accordance with the present invention; and Fig. 2 is a transverse sectional view of the structure of Fig. 1 taken adjacent the right hand end of Fig. 1.

Referring now to the drawings, it will be seen that the apparatus of the invention includes a worm screw 1 turnably mounted in an elongated tubular casing 2 and being turned with respect to the casing through the medium of any suitable drive, such as a motor or the like, in the direction of the arrow of Fig. 2 so as to move material in the casing from left to right as viewed in Fig. 1 and as shown by the horizontal arrow therein.

This casing 2 is provided at the right hand portion of Fig. 1 with a first portion formed with grooves 4 extending along the length thereof, and next to this first portion the casing 2 is provided with a second portion having a larger inner diameter than this first portion and being provided with a smooth inner surface free of any grooves, as shown at the left hand portion of Fig. 1. This larger inner diameter of the second portion of the casing is greater than the diameter at the bottom of grooves 4. Fig. 1 illustrates how the inner diameter of the casing 2 gradually changes at the place where these first and second portions of the casing 2 adjoin each other.

As can be seen in Fig. 2, the axial grooves 4 are so shaped that each has a side surface portion making approximately a right angle with a tangent to the inner surface of the casing, and an opposite side surface portion making an acute angle substantially smaller than a right angle with a tangent to the inner surface of the casing, the one side surface portion of each groove being located next to the opposite side surface portion of the next groove. The worm screw is adapted to rotate in the direction whereby material will slip towards the right angular side surface portions of the grooves, the shape of the grooves thus preventing slippage.

The second portion of the casing 2 is provided in spaced relation to the first portion thereof with an opening to which the hopper means 3 is connected for supplying material to the interior of the casing.

The worm screw 1 is provided with a thread which in the first portion of the casing has an outer diameter substantially equal to the smaller inner diameter of this first portion of the casing and which in the second portion of the casing is provided with a larger outer diameter substantially equal to the inner diameter of this second portion of the casing, as shown at 5 in Fig. 1. However, the root diameter of the worm screw 1 is substantially constant along the entire length thereof located in the first and second portions of the casing so that the portion 5 of the worm screw has a thread which is larger than the thread in the first portion of the casing.

Thus, when material is supplied to the casing through the hopper means 3, the worm screw will have no difficulty in handling the material at the entrance portion of the casing because, on the one hand, the casing has a larger inner diameter in the region of the hopper means 3, and, on the other hand, the thread portion 5 of the worm screw 1 is larger than the remainder of the worm screw thread so as to provide in cooperation with the enlarged casing diameter in the region of hopper 3 a strong and positive push on the material which efficiently moves the same along the casing 2 so that the above mentioned difficulty frequently encountered at the entrance area of presses of this type is overcome.

It will be understood that each of the elements described above, or two or more together, may also find a useful application in other types of extruding presses differing from the types described above.

While the invention has been illustrated and described as embodied in extruding presses having an enlarged worm screw portion at an enlarged entrance portion of the casing, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

An extruding press comprising, in combination, an elongated tubular casing having an elongated first inner cylindrical surface portion and an elongated second inner cylindrical surface portion next to said first surface portion, coaxial therewith, and of a larger diameter than the same, said casing being formed only at said first inner surface portion thereof with a plurality of relatively closely spaced axial grooves each of which has one side surface portion making approximately a right angle with a tangent to said first inner surface portion and an opposite side surface portion making an acute angle substantially smaller than a right angle with a tangent to said first inner surface portion, said one side surface portion of each groove being located next to said opposite side surface portion of the next groove, and said casing being formed with an opening in said second surface portion thereof; a worm screw coaxial with said casing turnably carried by the latter for rotation therein and having an outer helical periphery located closely adjacent to said first and second inner surface portions of said casing; and hopper means connected to said casing at said opening thereof to supply material to the interior of said casing.

References Cited in the file of this patent

UNITED STATES PATENTS

| | | |
|---|---|---|
| 1,904,884 | Royle | Apr. 18, 1933 |
| 1,935,050 | Gordon | Nov. 14, 1933 |
| 2,262,989 | Conklin et al. | Nov. 18, 1941 |
| 2,295,823 | Banigan et al. | Sept. 15, 1942 |
| 2,345,086 | Becker et al. | Mar. 28, 1944 |
| 2,422,480 | Gordon | June 17, 1947 |